United States Patent
Milby

(10) Patent No.: US 7,225,201 B1
(45) Date of Patent: May 29, 2007

(54) EXTENSIBLE DATA TYPE

(75) Inventor: Gregory H. Milby, San Marcos, CA (US)

(73) Assignee: NCR Corp., Dayton, OH (US)

( * ) Notice: Subject to any disclaimer, the term of this patent is extended or adjusted under 35 U.S.C. 154(b) by 700 days.

(21) Appl. No.: 10/113,188

(22) Filed: Apr. 1, 2002

(51) Int. Cl.
*G06F 17/00* (2006.01)

(52) U.S. Cl. .............................. 707/103 R; 707/103 Y; 707/101

(58) Field of Classification Search ................ 707/101, 707/100, 103 R, 103 Y
See application file for complete search history.

(56) References Cited

U.S. PATENT DOCUMENTS

| | | | | |
|---|---|---|---|---|
| 5,421,015 A | * | 5/1995 | Khoyi et al. ................ | 718/107 |
| 6,047,291 A | * | 4/2000 | Anderson et al. ........ | 707/103 R |
| 6,078,925 A | * | 6/2000 | Anderson et al. ........ | 707/103 R |
| 6,112,209 A | * | 8/2000 | Gusack ........................ | 707/101 |
| 6,338,056 B1 | * | 1/2002 | Dessloch et al. .............. | 707/2 |
| 6,466,933 B1 | * | 10/2002 | Huang et al. .................. | 707/3 |
| 6,697,818 B2 | * | 2/2004 | Li et al. .................. | 707/103 R |
| 2002/0124116 A1 | * | 9/2002 | Yaung ........................ | 709/313 |

* cited by examiner

*Primary Examiner*—Alford Kindred
*Assistant Examiner*—Thanh-Ha Dang
(74) *Attorney, Agent, or Firm*—Frommer, Lawrence, Haug LLP; Harden E. Stevens, III

(57) ABSTRACT

Methods and apparatus for implementing an extensible data type in a database management system. In one implementation, a database system includes: one or more data storage facilities for use in storing data composing records in tables of a database; one or more processing modules configured to manage the data stored in the data-storage facilities; a database management component configured to provide an object-based extensible data type, where an extensible data type includes one or more data members; and a type registry accessible by the database management component, where the type registry stores a registry object for each type supported by the database system and for at least one extensible data type.

20 Claims, 9 Drawing Sheets

Int Number_types
int MyTypeCode

TypeCtx typeCtx[...]   char* Names[...]   baseUdt * Types[...]

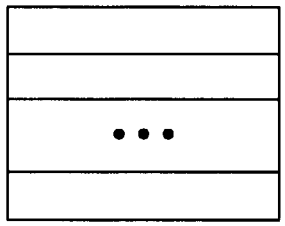   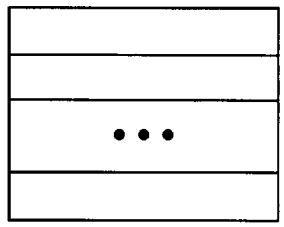   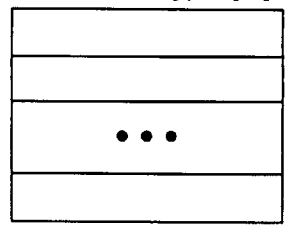

Constructors:
struct_type(char* string)
struct_type(int numArgs,baseUdt**Args)

DBS Support Methods:
fieldToClass(char* field, size)
classToField(char* field, size)
dupFromBaseType(TypeCtx*inTypeContext)
observer(char* namestring, baseUdt* returnValue)
mutator(char* namestring, baseUdt* newValue)
getValue(void* buf)
initParams(int numParams, char** Params)
isContainer()
equals(baseUdt* other, boolean result)

EXTENSIBLE DATA TYPE

BACKGROUND

The ANSI SQL-99 standard (American National Standards Institute Structured Query Language standard for 1999) introduced two new data types for user defined types (UDT): a user defined distinct type (UDT distinct type), and a user defined structured type (UDT structured type). The UDT distinct type is based on a predefined type, such as integer, and the UDT structured type is a composite type including one or more data members of one or more respective data types.

The user defined structured type shares many properties in common with the C-language "struct." Both a C-language struct and a UDT structured type can be declared to be composed of any number of data members which can be either homogeneous or heterogeneous with respect to their data types. Both a C-language struct and a UDT structured type can also be nested, containing data members which are themselves structured types. The declaration of a UDT structured type is entered into a database system (DBS) using SQL Data Definition Directives. While the ANSI SQL-99 standard defines the behavior and functionality to be provided by a UDT structured type, the standard does not define how to implement a UDT structured type.

SUMMARY

The present disclosure provides methods and apparatus for implementing an extensible data type in a database management system. In one implementation, a database system includes: one or more data storage facilities for use in storing data composing records in tables of a database; one or more processing modules configured to manage the data stored in the data-storage facilities; a database management component configured to provide an object-based extensible data type, where an extensible data type includes one or more data members; and a type registry accessible by the database management component, where the type registry stores a registry object for each type supported by the database system and for at least one extensible data type.

In another implementation, a method for providing an extensible data type in a database system includes: creating a type registry, where the type registry includes an entry for each of one or more data types each having a unique type identifier, and each entry indicates a registry object of the corresponding data type; and defining an extensible data type by: defining one or more data members for an extensible data type, where a data member is of a data type; defining a type count indicating how many data members are associated with the extensible data type; defining a type context for each data member, where a type context includes a type identifier indicating an entry in the type registry corresponding to the type context's corresponding data member; where the extensible data type is implemented as an object-based data type.

BRIEF DESCRIPTION OF THE DRAWINGS

FIG. 2 shows a representation of an extensible data type (EDT).

DETAILED DESCRIPTION

The present invention provides methods and apparatus for implementing an extensible data type (EDT) in a database management system. An EDT provides an object-based structure for supporting a user defined structured type (UDT structured type) in a database management system. In one implementation, an EDT provides the functionality and behavior defined for a UDT structured type in the ANSI SQL-99 standard. Accordingly, a database system implemented supporting EDT's can support UDT structured types in compliance with the ANSI SQL-99 standard.

In one implementation, an EDT provides the following functionality:

Accommodating a variable number of data members of diverse data types

Accommodating a nested environment

Collectively assigning values to the data members of the EDT

Creating a default-initialized instance of the EDT

Providing a persistent "in-storage" format

Providing an "in-memory" format

Assigning a value to a data member of the EDT

Retrieving a value of a data member of the EDT

Comparing two EDT's for equality

In alternative implementations, an EDT provides a subset of the functionality listed above. An EDT can also provide additional functionality to that listed above.

Figure 1:
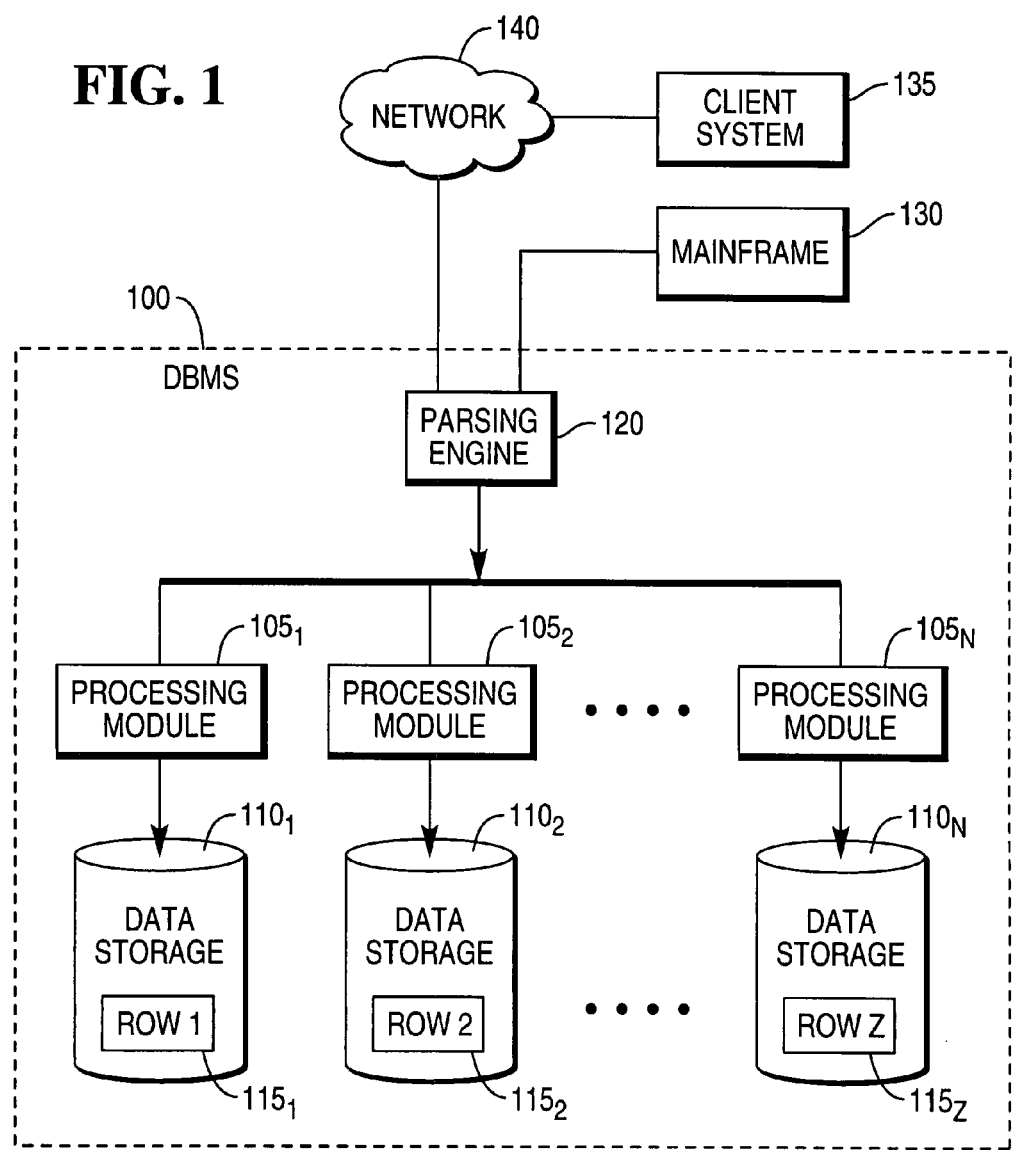
FIG. 1 shows a sample architecture of a database management system (DBMS).

FIG. 1 shows a sample architecture of a database management system (DBMS) 100. In one implementation, DBMS 100 is a parallel architecture, such as a massively parallel processing (MPP) architecture. DBMS 100 includes one or more processing modules $105_1 \ldots _N$ that manage the storage and retrieval of data in corresponding data-storage facilities $110_1 \ldots _N$. Each of processing modules $105_1 \ldots _N$ manages a portion of a database that is stored in a corresponding one of data storage facilities $110_1 \ldots _N$. Each of data storage facilities $110_1 \ldots _N$ includes one or more storage devices, such as disk drives.

As described below, DBMS 100 stores and retrieves data for records or rows in tables of the database stored in data storage facilities $110_1 \ldots _N$. Rows $115_1 \ldots _Z$ of tables are stored across multiple data storage facilities $110_1 \ldots _N$ to ensure that system workload is distributed evenly across processing modules $105_1 \ldots _N$. A parsing engine 120 organizes the storage of data and the distribution of rows 115$_{1...Z}$ among processing modules 105$_{1...N}$ and data storage facilities 110$_{1...N}$. In one implementation, parsing engine 120 forms a database management component for DBMS 100. Parsing engine 120 also coordinates the accessing and retrieval of data from data storage facilities 110$_{1...N}$ in response to queries received from a user at a connected mainframe 130 or from a client computer 135 across a network 140. DBMS 100 usually receives queries in a standard format, such as the Structured Query Language (SQL) put forth by the American Standards Institute (ANSI). In one implementation, DBMS 100 is a Teradata Active Data Warehousing System available from NCR Corporation.

SQL provides various defined types of data and methods for accessing and manipulating data. SQL also supports user defined types (UDT) and user defined methods (UDM). As specified in ANSI SQL-99, UDT's include UDT structured types. A UDT structured type has one or more data members (also called attributes) of corresponding data types and zero or more associated UDM's (a UDT structured type may also have inherited UDM's that are inherited from other UDT's). In one implementation, DBMS 100 supports SQL and includes support for UDT structured types through extensible data types (EDT's). To accommodate UDT structured types, DBMS 100 uses EDT's internally to represent the user's defined UDT structured type. A UDT structured type can be considered the user's perspective and an EDT can be considered the perspective of DBMS 100 of the internal representation of the UDT structured type. Accordingly, the description below describes an implementation of an EDT in DBMS 100 supporting UDT structured types.

A UDT structured type is defined by a user of DBMS 100 using data definition directives. Accordingly, DBMS 100 does not inherently recognize a particular UDT structured type. To be able to use a UDT structured type, the user registers the UDT structured type with DBMS 100 in a UDT Type Registry. This registration defines the data members of the UDT structured type and any UDM's defined upon the UDT structured type. DBMS 100 uses the registration to create an EDT to represent the registered UDT structured type. Using object-based EDT's, DBMS 100 advantageously uses object techniques such as inheritance, overriding, and messaging to support UDT structured types.

FIG. 2 shows a representation of an EDT. In one implementation, C++ is used as the base design language for defining an EDT. Block 205 represents an EDT as a structured data type using a C++ class named "struct_type". Block 205 shows the data members and member functions of the class struct_type. A class "struct_type" object is used to contain a collection of data types, such as predefined types or UDT structured types. A class struct_type object has five data members used to define a UDT structured type, as shown in block 205:

Number_types: an integer indicating the number of data types within the UDT structured type.

MyTypeCode: an integer indicating the unique type identifier for the UDT structured type to be used in the UDT Type Registry.

TypeCtx[ ]: an array of TypeCtx structs, one TypeCtx struct for each data type within the UDT structured type. A TypeCtx struct contains a type identifier that uniquely identifies the corresponding data type. TypeCtx structs are used in the UDT Type Registry. In an alternative implementation, the TypeCtx array is an array of type identifiers, such as integers.

Names[ ]: an array of character strings, one string for each data type within the UDT structured type. Each character string contains the name of the corresponding data member of the UDT structured type.

Types[ ]: an array of pointers to classes representing the data members of the UDT structured type. Each class is based on the baseUDT C++ class. This common inheritance allows each class object to be pointed to by a pointer to baseUDT. Accordingly, the Types[ ] array is an array of pointers to baseUDT.

The arrays are indexed using a common pattern so that data for a data member is stored in each array at the same position.

A class struct_type object has a suite of member functions (methods) to provide the functionality of an EDT, supporting a UDT structured type. These member functions are collectively referred to herein as "DBS Support Methods." The DBS Support Methods include, as shown in block 205:

struct_type( ): a constructor method used during the initial UDT structured type registration.

initParams( ): initializes each of the objects representing the UDT structured type's data members.

dupFromBaseType( ): provides a default-initialized instance of the UDT structured type.

classToField( ): provides a persistent in-storage format for the UDT structured type.

fieldToClass( ): provides an in-memory format for the UDT structured type.

observer( ): retrieves the value of one of the UDT structured type's data members.

mutator( ): sets the value of one of the UDT structured type's data members.

getvalue( ): retrieves a pointer to the value of a data member.

setValue( ): replaces the current value of a data member with a new value.

equals( ): compares two UDT structured types for equivalence.

isContainer( ): serves as a flag identifying the data type as representing a predefined type or a UDT structured type.

Figure 3:
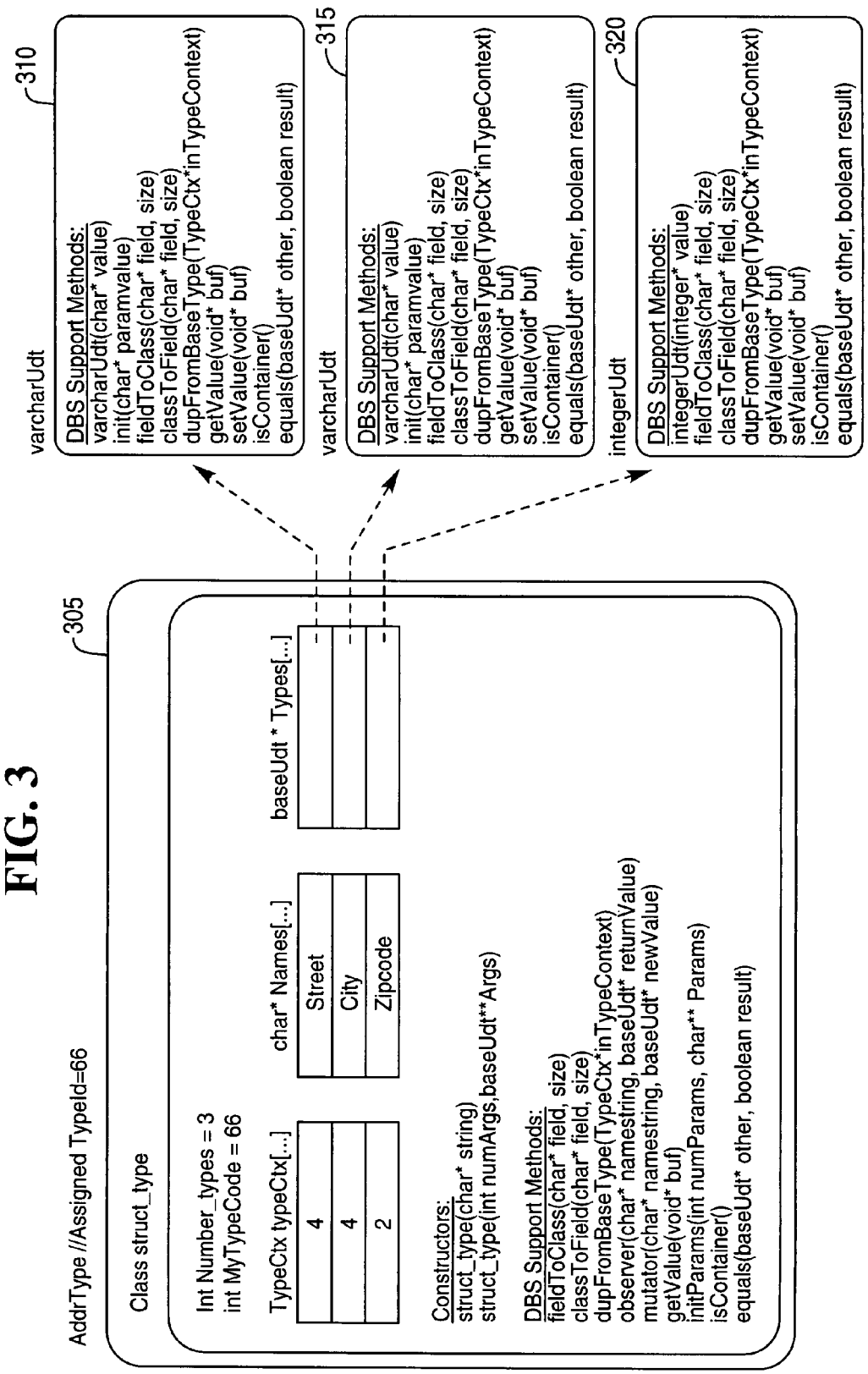
FIG. 3 shows an example of a UDT structured type and its data members represented by a struct_type object.

In addition to UDT structured types, ANSI predefined data types are also represented by C++ object classes encapsulating the functionality of the represented predefined type in DBMS 100. Each encapsulated predefined type also includes the same suite of DBS Support Methods provided for the class struct_type, except that the encapsulated predefined types do not include observer( ), mutator( ), and initParams( ) methods and do include an init( ) method. Each C++ object has an associated constructor function that can be invoked to create an initialized instance of that class. init( ) sets the value of the object to a supplied initial value. DBMS 100 manages which constructor maps to which predefined type. In one implementation, classes encapsulating predefined types are defined for:

Variable Character Data Type
Fixed Character Data Type
Character Large Object Data Type
Variable Byte Data Type
Fixed Byte Data Type
Byte Large Object Data Type
Integer Data Types
Real Data Type
Decimal Data Type
Time Interval Data Types
Date Data Type FIG. 3 shows an example of a UDT structured type and its data members represented by a struct_type object. The UDT structured type is named AddrType. AddrType includes three data members: Street, City, and Zipcode. Street is a string of varchar(20). City is a string of varchar(20). Zipcode is an integer. A user can create AddrType using the SQL statement:

```
CREATE TYPE AddrType AS (Street varchar(20), City
varchar(20), Zipcode integer);
```

DBMS 100 assigns a unique type identifier to AddrType, shown as 66 in FIG. 3, and stores an instance of the struct_type and its data member objects for AddrType in the UDT Type Registry.

AddrType is represented by a struct_type object as shown in block 305. Num_types is 3. MyTypeCode is 66 (as an example). The typeCtx array includes three TypeCtx structs. In block 305, three values are shown (4, 4, 2) to indicate example type identifiers for the three types contained in AddrType. The Names array points to three strings for the names of the data types contained in AddrType: "Street", "City", and "Zipcode". The Types array includes three pointers to objects of classes representing the predefined types contained in AddrType: varcharUDT 310, varcharUDT 315, and integerUDT 320. These objects are referred to as data member objects. Accordingly, each of the data members contained in AddrType is represented by a combination of entries in the arrays typeCtx, Names, and Types. For example, the data member Street is represented by a TypeCtx identifier of 4, a string "Street", and a pointer to a data member object of the class varcharUDT. AddrType includes the DBS Support Methods described above. Similarly, the varcharUDT and integerUDT objects include appropriate DBS Support Methods, as described above.

Figure 4:
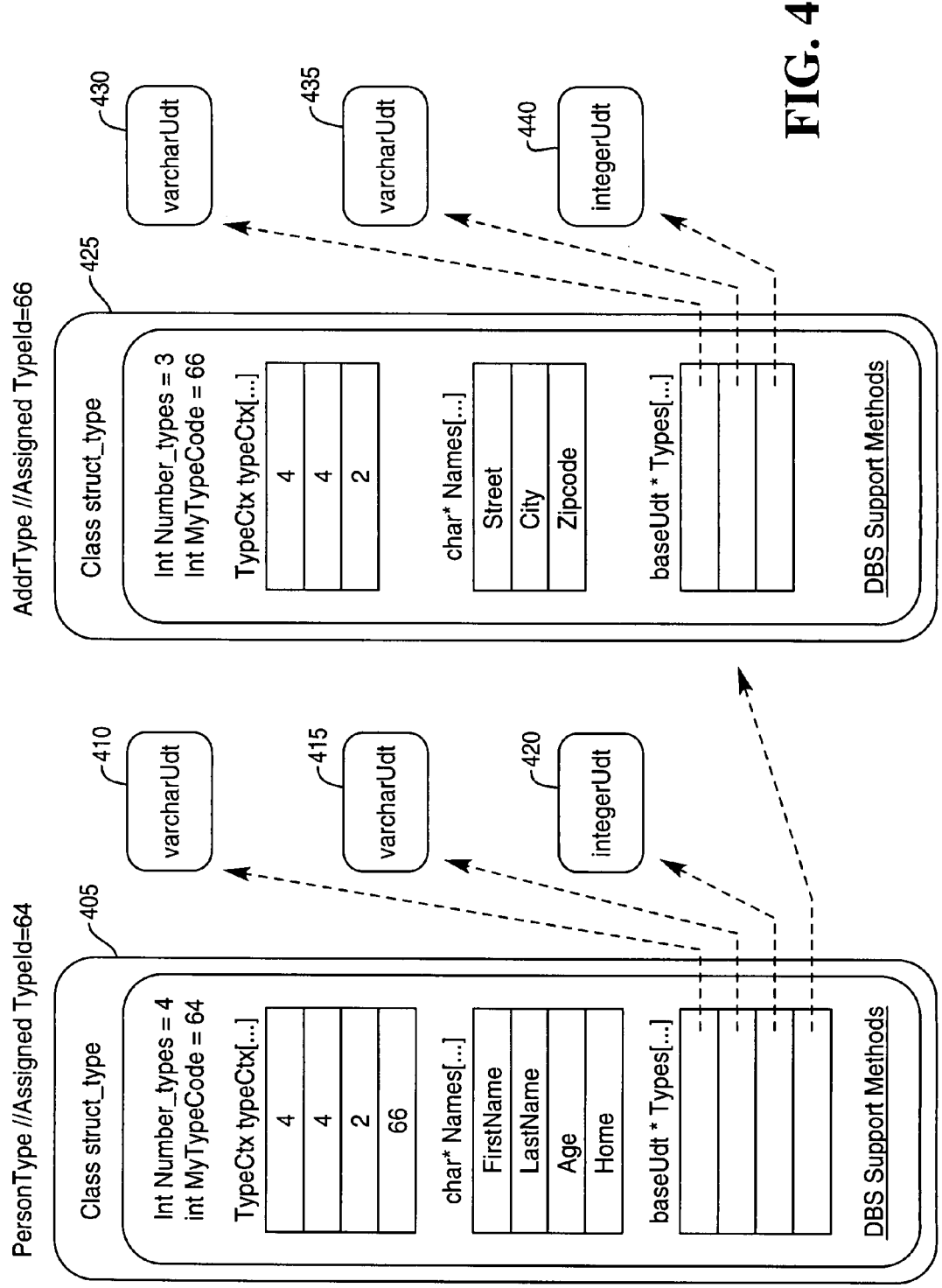
FIG. 4 shows an example of a nested UDT structured type.

FIG. 4 shows an example of a nested UDT structured type. The UDT structured type is named PersonType. PersonType includes four data members: FirstName, LastName, Age, and Home. FirstName is a string of varchar(20). LastName is a string of varchar(20). Age is an integer. Home is a UDT structured type, AddrType, as shown in FIG. 3. A user can create PersonType using the SQL statement (after creating AddrType):

```
CREATE TYPE PersonType AS (FirstName varchar(20),
LastName varchar(20), Age integer, Home AddrType);
```

DBMS 100 assigns a unique type identifier to PersonType, shown as 64 in FIG. 4, and stores an instance of the struct_type for PersonType in the UDT Type Registry.

PersonType is represented by a struct_type object as shown in block 405, similar to block 305 for AddrType in FIG. 3. Num_types is 4. MyTypeCode is 64 (as an example). The typeCtx array includes four TypeCtx structs. In block 405, four values are shown (4, 4, 2, 66) to indicate example type identifiers for the four types contained in PersonType. As in FIG. 3, the example type identifier for AddrType is shown as 66. The Names array points to four strings for the names of the data types contained in PersonType: "FirstName", "LastName", "Age", and "Home". The Types array includes four pointers to objects of classes representing the types contained in PersonType: varcharUDT 410, varcharUDT 415, integerUDT 420, and AddrType 425. The nested UDT structured type AddrType object 425 for data member "Home" includes data members as shown in FIG. 3 and points to objects for data members of AddrType: varcharUDT 430, varcharUDT 435, and integerUDT 440.

Figure 5:
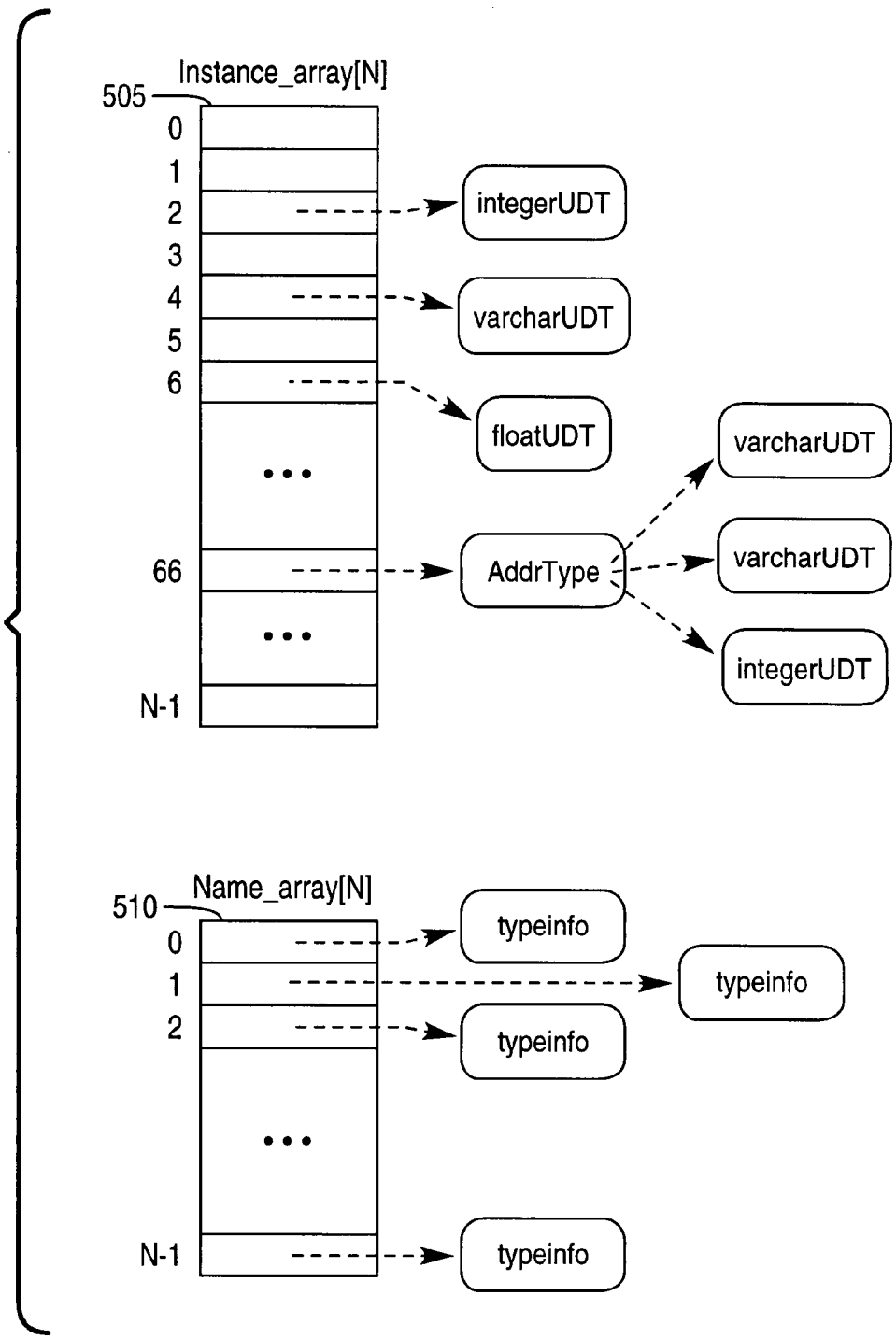
FIG. 5 shows a representation of a UDT Type Registry.

FIG. 5 shows a representation of the UDT Type Registry. The UDT type registry can be stored in a single commonly accessible location within DBMS 100, such as parsing engine 120, or distributed or mirrored among multiple locations, such as in parsing engine 120 and each of processing modules $105_{1...N}$. The UDT Type Registry includes an instance array 505 of pointers to objects of classes, including classes for UDT structured types. These objects are referred to as registry objects. DBMS 100 uses registry objects as templates for creating new instances of registered types. Instance array 505 includes an entry for each class used in DBMS 100. When a new type is created, DBMS 100 creates a new entry in instance array 505 with a new corresponding type identifier. The type identifiers used to access entries in instance array 505 are the type identifiers indicated by TypeCtx structs in the typeCtx arrays of struct_type class objects. An entry for a UDT structured type points to a registry object for the EDT representing the UDT structured type (i.e., the struct_type object), which in turn points to registry objects for its data members, as shown in FIGS. 3 and 4. In an alternative implementation, the entry for a UDT structured type points to the struct_type object for the UDT structured type but the struct_type object does not point to any other objects. In this case, the objects for the struct_type object's data members are created when a new instance of the UDT structured type is created, such as by using the types indicated in the Names array.

UDT Type Registry also includes a name array 510 indicating a correlation between names (strings) and type identifiers (typeCtx structs). Each entry in name array 510 corresponds to a type in instance array 505. In one implementation, an entry in name array 510 indicates a typeinfo struct including a string for a name of the associated type and a typeCtx struct indicating the type identifier. DBMS 100 can use name array 510 to convert a name of a type (e.g., from a Names array in a struct_type object) to a type identifier to access an entry in instance array 505.

The UDT Type Registry provides an interface to access the entries in instance array 505 and name array 510:

udtGetInstance(TypeCtx &typeCtxIn, baseUdt*instanceOut): returns a pointer to an instance (a registry object) of the type in the entry of instance array 505 corresponding to the type identifier indicated by the typeCtxIn parameter. In one implementation, udtGetInstance returns a pointer to a newly created instance using dupFromBaseType( ).

udtNameToTypeCtx(char*name, TypeCtx & typeCtxOut): returns a typeCtx corresponding to the type indicated by the name parameter using name array 510.

DBMS 100 uses the constructor function for the corresponding struct_type when registering a UDT structured type. The SQL CREATE TYPE statement results in a call to the appropriate constructor. For example,

```
CREATE TYPE AddrType AS (Street varchar(20), City
varchar(20), Zipcode integer);
``` results in this call:

```
NEW struct_type("Street varchar(20), City varchar(20),
    Zipcode integer");
```

The constructor function parses the string received to evaluate the data members of the UDT structured type and establish an appropriate object. DBMS 100 uses constructor functions for creating registry objects as well as creating objects for storing data representing fields in rows in the database.

Figure 6:
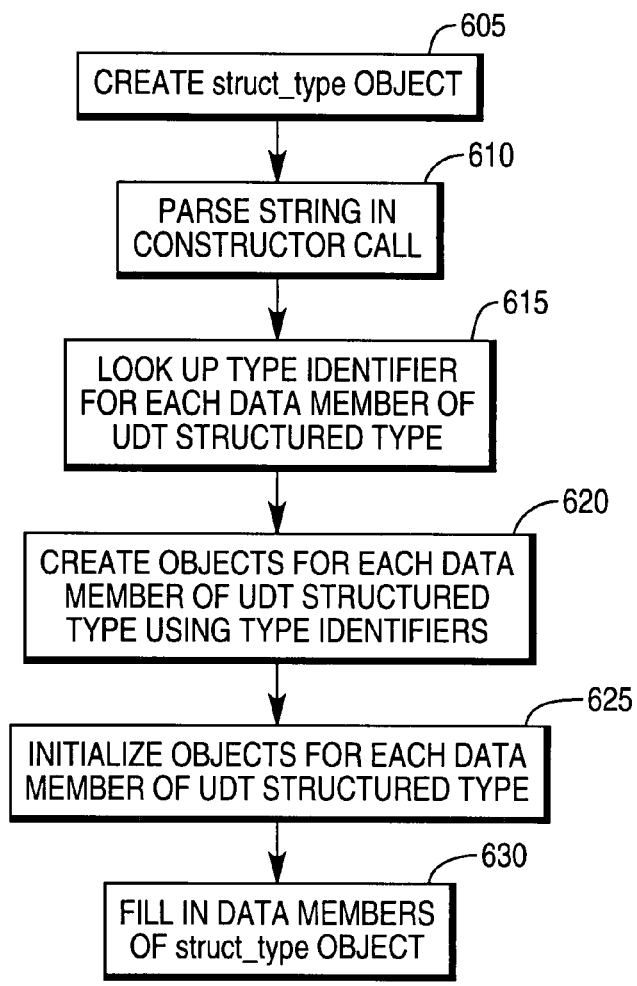
FIG. 6 is a flowchart of the operation of a constructor function for a struct_type object.

FIG. 6 is a flowchart of the operation of a constructor function for a struct_type object. Initially, upon receiving a constructor call, DBMS 100 creates a struct_type object, block 605. In an alternative implementation, DBMS 100 creates the struct_type object before receiving the constructor call, such as in response to a request from parsing engine 120 after receiving the CREATE TYPE statement. DBMS 100 parses the string received as a parameter for the constructor call to ascertain the data members of the UDT structured type, block 610. In one implementation, DBMS 100 parses the string using the pattern "name type, . . . , name type". For each data member of the UDT structured type, DBMS 100 calls udtNameToTypeCtx( ) using the name of the data member's type to determine the data members type identifier, block 615. As described above, udtNameToTypeCtx returns a type identifier using a typeCtx struct by matching a supplied name to an entry in the name array in the UDT Type Registry (e.g., name array 505 in FIG. 5). DBMS 100 uses the retrieved type identifiers to create a data member object for each data member of the UDT structured type, block 620. DBMS 100 calls udtGetInstance( ) with each type identifier to obtain an instance of each of the corresponding classes. As described above, each encapsulated predefined type (e.g., varcharUDT) also has a corresponding constructor function. DBMS 100 initializes the data member object for each data member of the UDT structured type, block 625. In one implementation, DBMS 100 initializes the data member objects by using the DBS Support Method initParams( ). initParams( ) in turn calls the init( ) method for each encapsulated predefined type object. In an alternative implementation, DBMS 100 only initializes objects of parameterized types. DBMS 100 fills in the data members of the struct_type object with the results of the previous actions, block 630. DBMS 100 stores the number of data members of the UDT structured type in Number_types. DBMS 100 stores the type identifier for the new UDT structured type in MyTypeCode. DBMS 100 stores the type identifier for each data member of the UDT structured type in the typeCtx array. DBMS 100 stores the name of each data member of the UDT structured type in the Names array. DBMS 100 stores the pointer to each data member object in the Types array. The process shown in FIG. 6 applies to nested UDT structured types as well. When retrieving type identifiers and creating objects for data members of a UDT structured type, the data members can themselves also be UDT structured types which in turn create objects for their data members, and so on.

As described above, an EDT provides for collectively assigning values to data members of the UDT structured type. The constructor function for the struct_type object can receive values to which to set the data member objects. For example, referring to the UDT structured type AddrType shown in FIG. 3, in response to this SQL statement:

```
INSERT INTO TableA VALUES(3, NEW ADDRTYPE("1292 Maple
    Valley Road", "Santa Fe", 68080));
``` results in this call:

```
NEW AddrType(NEW varcharUDT("1292 Maple Valley Road"),
    NEW varcharUDT("Santa Fe"), NEW integerUDT(68080));
```

DBMS 100 creates a new AddrType object and new data member objects. The data members have the values provided in the INSERT statement: Street is "1292 Maple Valley Road", City is "Santa Fe", and Zipcode is 68080. Referring to the flowchart in FIG. 6 for collective assignment calls, for blocks 620 and 625, when DBMS 100 creates the data member objects, DBMS 100 sets the values for the data member objects to the values received in the constructor call rather than initializing the values, such as to default values. In one implementation, an object is created for each parameter provided in the constructor call and the entries in the Types array of the struct_type object are set to point to the created objects.

In one implementation, udtGetInstance( ) handles object initialization by calling dupFromBaseType( ) to create a default-initialized object for each data member. As described above, after registering a UDT structured type, an entry in the instance array in the UDT Type Registry points to an instance of the EDT representing the UDT structured type (a registry object). dupFromBaseType( ) creates an object which is a copy of the registry object. In this case, DBMS 100 can use initParams( ) and init( ) methods to set values for registry objects when creating types.

Figure 7:
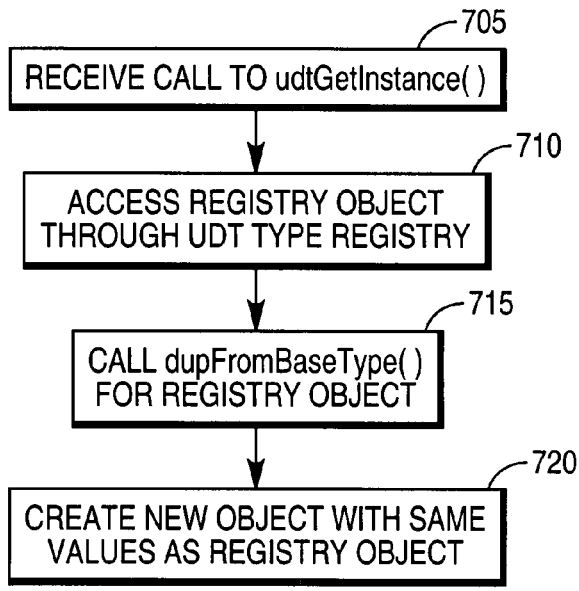
FIG. 7 is a flowchart of creating an object using the DBS Support Method dupFromBaseType( ).

FIG. 7 is a flowchart of creating an object using the DBS Support Method dupFromBaseType( ). DBMS 100 receives a call to udtGetInstance( ), such as from a constructor function, block 705. DBMS 100 accesses the registry object pointed to by the entry in the instance array of the UDT Type Registry corresponding to the type identifier supplied in the call to udtGetInstance( ), block 710. DBMS 100 calls the dupFromBaseType( ) method for the registry object, block 715. DBMS 100 also calls dupFromBaseType( ) for each data member object of the registry object (e.g., iteratively) and for any nested UDT structured type objects. DBMS 100 creates a new object of the same type and having the same values as the registry object, block 720. DBMS 100 also creates objects for data member objects and nested objects.

As described above, an EDT provides a persistent in-storage format for the UDT structured type and an in-memory format for the UDT structured type. DBMS 100 uses the in-storage format to store objects, such as to data storage facilities $110_1 \ldots _N$. DBMS 100 uses the in-memory format to access and modify objects. DBMS 100 uses DBS Support Method classToField( ) to convert an EDT object from an in-memory format to a persistent in-storage format. DBMS 100 uses DBS Support Method fieldToClass( ) to convert an EDT object from a persistent in-storage format to an in-memory format.

classToField( ) converts the EDT object to the in-storage format by writing the struct_type object's data in a flattened form to a target structure referred to as a "build row." The build row has two sections: an identifier field storing an identifier for the build row, and a structured UDT field storing data for objects contained in the EDT object. The classToField( ) method for the struct_type object iterates through the data members pointed to by the Types array and invokes each object's classToField( ) method. In one implementation, after writing out the data for the EDT object and each of its data member objects, these objects are destroyed. This pseudo-code provides an overview of the operation of classToField( ):

```
struct_type::classToField(field, size)
    tmpPtr = field;
    tmpSize = 0;
    write data at tmpPtr;
    for (i=0; i<Number_types; i++)
    {
        Types[i]->classToField(tmpPtr, tmpSize);
        tmpPtr = tmpPtr + tmpSize;
        size = size + tmpSize;
    }
    return SUCCESS;
```

Figure 8:
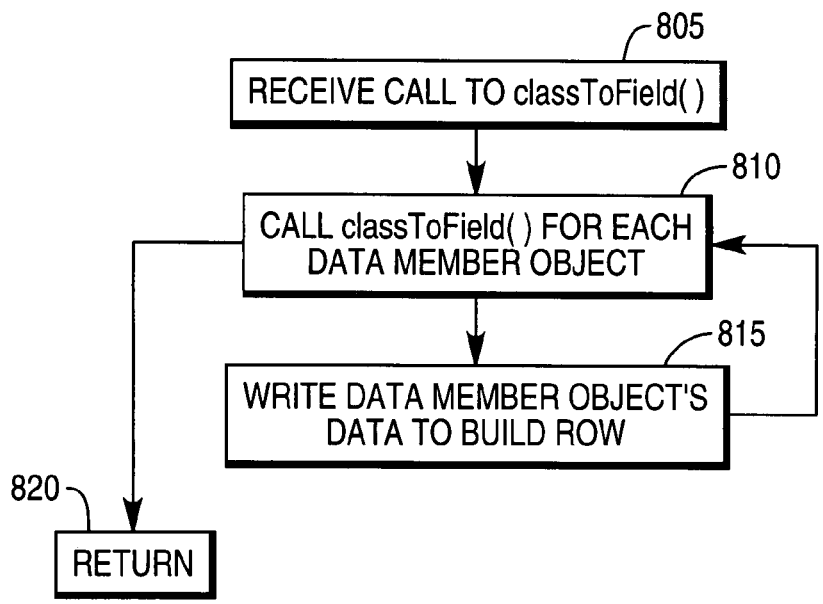
FIG. 8 is a flowchart of the operation of the DBS Support Method classToField( ).

FIG. 8 is a flowchart of the operation of the DBS Support Method classToField( ). DBMS 100 receives a call to classToField( ), block 805. DBMS 100 calls classToField( ) for each data member object (e.g., iteratively), block 810. DBMS 100 also calls classToField( ) in turn for nested data member objects. In a call to classToField( ), DBMS 100 writes the data for the calling object to the build row, block 815. After returning from each data member object's classToField( ) call, DBMS 100 returns from the original classToField( ) call, block 820. In this way, DBMS 100 converts the EDT object to a persistent in-storage format and stores data for each data member object of the EDT object, including nested objects.

For example, referring to the UDT structured type AddrType shown in FIG. 3, in a call to classToField( ) for AddrType, DBMS 100 first writes out any data to be preserved for the struct_type. DBMS 100 then calls classToField( ) for each data member object: for varcharUDT, for varcharUDT, and then for integerUDT. As the methods for the data member objects are called, each writes out data for its object.

The DBS Support Method fieldToClass( ) operates similarly to classToField( ), but reads data from an in-storage format into an in-memory format. fieldToClass( ) reads data from a build row to fill in an EDT object. DBMS 100 creates an empty EDT object using udtGetInstance( ) and fills in the EDT object using fieldToClass( ). The fieldToClass( ) method for the struct_type object iterates through the data members pointed to by the Types array and invokes each object's fieldToClass( ) method. This pseudo-code provides an overview of the operation of fieldToClass( ):

```
struct_type::fieldToClass(field, size)
    tmpPtr = field;
    tmpSize = 0;
    fieldsize = size;
    read data at tmpPtr;
    for (i=0; i<Number_types; i++)
    {
        tmpSize = Types[i]->getFieldSize( );
        Types[i]->fieldToClass(tmpPtr, tmpSize);
        tmpPtr = tmpPtr + tmpSize;
        fieldsize = fieldsize - tmpSize;
        if (fieldsize < 0) return ERROR;
    }
    return SUCCESS;
```

Figure 9:
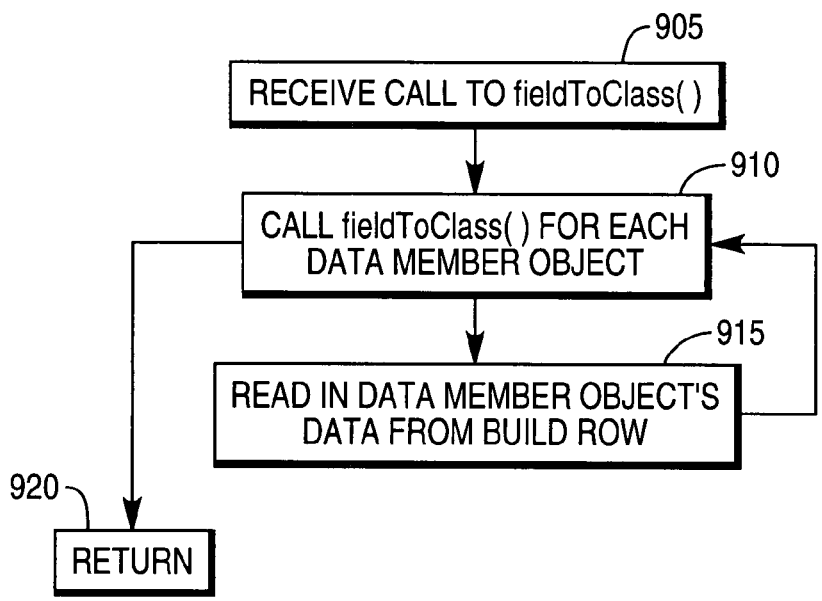
FIG. 9 is a flowchart of the operation of the DBS Support Method fieldToClass( ).

FIG. 9 is a flowchart of the operation of the DBS Support Method fieldToClass( ). DBMS 100 receives a call to fieldToClass( ), block 905. DBMS 100 calls fieldToClass( ) for each data member object (e.g., iteratively), block 910. DBMS 100 also calls fieldToClass( ) in turn for nested data member objects. In a call to fieldToClass( ), DBMS 100 reads the data for the calling object from the build row, block 915. DBMS 100 uses the data read from the build row to fill in an EDT object and its data member objects. After returning from each data member object's fieldToClass( ) call, DBMS 100 returns from the original fieldToClass( ) call, block 920. In this way, DBMS 100 converts the EDT object to an in-memory format and reads in data for each data member object in the EDT object, including nested objects.

For example, referring to the UDT structured type AddrType shown in FIG. 3, in a call to fieldToClass( ) for AddrType, DBMS 100 first reads in any data for the struct_type. DBMS 100 then calls fieldToClass( ) for each data member object: for varcharUDT, for varcharUDT, and then for integerUDT. As the methods for the data member objects are called, each reads in data for its object.

As described above, an EDT provides for retrieving and assigning data values for data members of the UDT structured type. DBMS 100 uses DBS Support Method observer( ) to retrieve a data value and DBS Support Method mutator( ) to assign a data value.

DBMS 100 calls observer( ) when a data value for a data member in an EDT has been requested, such as in a SELECT SQL DML (Data Manipulation Language) statement. observer( ) receives the name of a data member for which to retrieve a value and searches the Names array of the struct_type using the received name. After finding the data member name in the Names array, a pointer to the object corresponding to the data member is retrieved from the Types array from the corresponding entry (e.g., Names[0] corresponds to Types[0]). DBMS 100 then calls the DBS Support Method getvalue( ) to obtain the value for the retrieved object. In an alternative implementation, observer( ) calls getvalue( ). An observer( ) function can be identified from the footprint: "Attribute_name( ) . . . " This pseudo-code provides an overview of the operation of observer( ):

```
struct_type::observer(namestring, returnValue)
    readToken(namestring, &tokenBuffer1, size1);
    for (1=0; i<Number_types; i++)
    {
        if (stringcompare(&tokenBuffer1, Names[i])
        {
            returnValue = Types[i];
            return SUCCESS;
        }
    }
    return ERROR;
```

Figure 10:
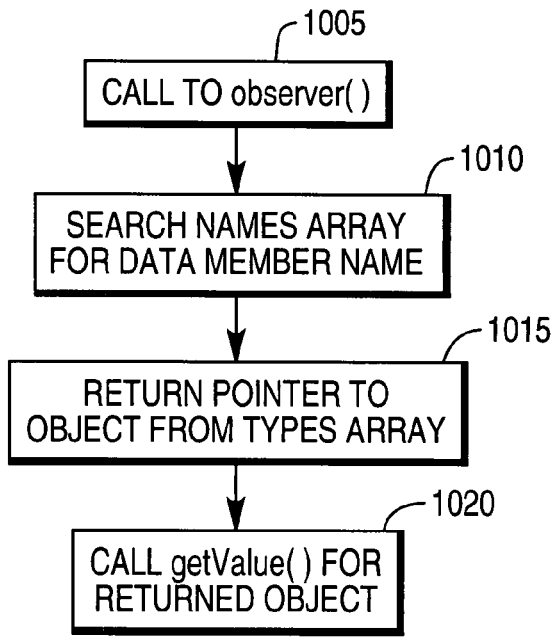
FIG. 10 is a flowchart of retrieving a value for a data member using the DBS Support Methods observer( ) and getValue( ).

FIG. 10 is a flowchart of retrieving a value for a data member using the DBS Support Methods observer( ) and getvalue( ). DBMS 100 makes a call to observer( ), block 1005. The call includes as a parameter a name of the data member for which a value is to be retrieved. DBMS 100 searches the Names array of the struct_type object for the received name parameter, block 1010. After locating the matching entry in the Names array, DBMS 100 returns a pointer from the Types array that corresponds to the matching entry in the Names array, block 1015. The returned pointer indicates an object representing the data member of the UDT structured type. DBMS 100 calls getvalue( ) for the object indicated by the returned pointer, block 1020. The value returned by getvalue( ) is the value of the data member. In this way, DBMS 100 retrieves the value for a data member.

For example, referring to the UDT structured type AddrType shown in FIG. 3, a table can be created including a field of AddrType using this declaration:

```
CREATE TABLE TableA AS (Id integer, EmpAddress
    AddrType);
```

This statement retrieves the value of the data member "Street":

```
SELECT EmpAddress.Street( ) FROM TableA;
```

In response, DBMS 100 calls observer( ) and getvalue( ):

```
AddrTypePtr->observer("Street", returnValue);
returnValue->getValue( );
```

DBMS 100 calls observer( ) for the struct_type object representing the field EmpAddress using the pointer AddrTypePtr. In observer( ), DBMS 100 matches "Street" to the entry in the Names array of the EmpAddress object. As shown in FIG. 3, "Street" is stored in Names[0]. DBMS 100 returns the pointer stored at Types[0], pointing to a varcharUDT object. DBMS 100 then calls getvalue( ) for the retrieved varcharUDT object. In this example, getvalue( ) returns a variable character string representing the contents of the varcharUDT data member.

DBMS 100 uses observer( ) and getvalue( ) in a similar way to retrieve a value for nested UDT structured types. For example, referring to the UDT structured types PersonType and AddrType shown in FIG. 4, a table can be created including a field of PersonType (including a nested AddrType) using this declaration:

```
CREATE TABLE TableB AS (Id integer, Employee
    PersonType);
```

This statement retrieves the value of the data member "Street":

```
SELECT Employee.Home( ).Street( ) FROM TableB;
```

In response, DBMS 100 calls observer( ) and getvalue( ):

```
PersonTypePtr->observer("Home", returnValue);
returnValue->observer("Street", returnValue);
returnValue->getValue( );
```

DBMS 100 first calls observer( ) for the struct_type object representing the field Employee. In the first observer( ) call, DBMS 100 matches "Home" to the entry in the Names array of the Employee object. As shown in FIG. 4, "Home" is stored in Names[3]. DBMS 100 returns the pointer stored at Types[3], pointing to an AddrType object. In the second observer( ) call, DBMS 100 matches "Street" to the entry in the Names array of the Home object. As shown in FIG. 4, "Street" is stored in Names[0]. DBMS 100 returns the pointer stored at Types[0], pointing to a varcharUDT object. DBMS 100 then calls getvalue( ) for the retrieved varcharUDT object. In this example, getvalue( ) returns a variable character string representing the contents of the varcharUDT data member. In an alternative implementation, a call to observer( ) includes the entire token string (e.g., "Employee.Home( ).Street( )").

DBMS 100 calls the DBS Support Method mutator( ) when a data value for a data member in an EDT is to be changed, such as in an UPDATE SQL statement. DBMS 100 locates the data member and sets the value for the object using setvalue( ). DBMS 100 calls mutator( ) providing the name of the data member and the new value for the data member. mutator( ) searches the Names array of the struct_type using the received name. After finding the data member name in the Names array, a pointer to the object corresponding to the data member is retrieved from the Types array from the corresponding entry (e.g., Names[0] corresponds to Types[0]). mutator( ) calls setValue( ) to change the value of the data member object pointed to from the Types array. The mutator( ) function returns a pointer ("this" in the example below) pointing to the current class (i.e., the class including the Names and Types arrays). A mutator( ) function can be identified from the footprint: "Attribute_name(SetValueParameter) . . . " This pseudocode provides an overview of the operation of mutator( ):

```
struct_type::mutator(namestring, returnValue,
    newValue)
    readToken(namestring, &tokenBuffer1, size1);
    for (i=0; i<Number_types; i++)
    {
        if (stringcompare(&tokenBuffer1, Names[i])
        {
            Types[i]->setValue(newValue);
            returnValue = this;
            return SUCCESS;
        }
    }
    return ERROR;
```

Figure 11:
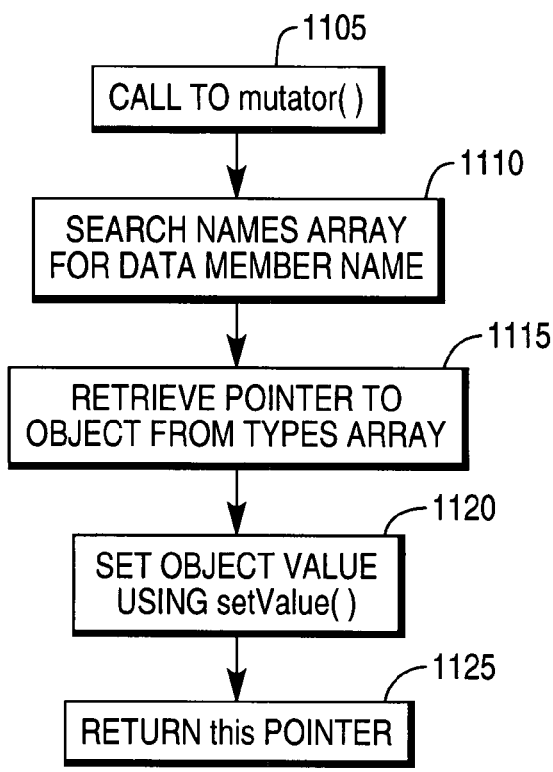
FIG. 11 is a flowchart of setting a value for a data member to a new value using the DBS Support Methods mutator( ) and setValue( ).

FIG. 11 is a flowchart of setting a value for a data member to a new value using the DBS Support Methods mutator( ) and setValue( ). DBMS 100 makes a call to mutator( ), block 1105. The call includes as a parameter a name of the data member for which a value is to be retrieved and the new value for the data member. DBMS 100 searches the Names array of the struct_type object for the received name parameter, block 1110. After locating the matching entry in the Names array, DBMS 100 retrieves a pointer from the Types array that corresponds to the matching entry in the Names array, block 1115. The returned pointer indicates an object representing the data member of the UDT structured type. In mutator( ), DBMS 100 calls setValue( ) for the object indicated by the entry in the Types array, passing the new value as a parameter, block 1120. setValue( ) sets the value of the object to the new value. DBMS 100 returns the "this" pointer (i.e., a pointer to the current class) and exits mutator( ), block 1125. In this way, DBMS 100 sets the value for a data member.

In one example, referring to the UDT structured type AddrType shown in FIG. 3, a table includes records containing a field of type AddrType, and a user enters a statement to set the value of the Street data member in an employee address member by using the clause: "EmpAddress.Street("MLK Avenue"). Where "AddrTypePtr" indicates the struct_type object, DBMS 100 calls mutator( ):

```
*newValue = "MLK Avenue";
AddrTypePtr->mutator("Street", returnValue, newValue);
```

In response to the EmpAddress field reference, DBMS 100 retrieves the pre-existing AddrType object from the database and sets a pointer, AddrTypePtr, to point to the retrieved AddrType object. DBMS 100 calls mutator( ) for the struct_type object representing the field EmpAddress using the pointer AddrTypePtr. In mutator( ), DBMS 100 matches "Street" to the entry in the Names array of the EmpAddress object. As shown in FIG. 3, "Street" is stored in Names [0]. DBMS 100 retrieves the pointer stored at Types[0], pointing to a varcharUDT object. DBMS 100 then sets the value of the varcharUDT object pointed to by the retrieved pointer to the new value, "MLK Avenue" mutator( ) returns a pointer to the struct_type object (i.e., the "this" pointer). The other data members of the AddrType object remain unchanged.

For setting values in existing nested UDT structured type objects, DBMS 100 uses a combination of observer( ) and mutator( ) calls to change a value. For example, referring to the UDT structured types PersonType and AddrType shown in FIG. 4, a user enters a statement to set the value of the Street data member in an employee address member by using the clause: "Employee.Home(Employee.Home( ).Street("MLK Avenue")). In processing this SQL clause, DBMS 100 starts with the innermost "Employee.Home( ).Street("MLK Avenue")" expression. In response to the Employee field reference, DBMS 100 retrieves the pre-existing PersonType object from the database and sets a pointer, PersonTypePtr, to point to the retrieved PersonType object. DBMS 100 then calls observer( ) and mutator( ):

```
PersonTypePtr->observer("Home", returnValue);
*newValue = "MLK Avenue";
returnValue->mutator("Street", returnValue, newValue);
```

DBMS 100 calls observer( ) to retrieve a pointer to the Home AddrType object. DBMS 100 calls mutator( ) for the referenced object to set the value of the object's Street member to "MLK Avenue", similar to the previous example. mutator( ) returns a pointer to the struct_type object in returnValue.

DBMS 100 next processes the outer expression "Employee.Home( . . . )". DBMS 100 again retrieves the pre-existing PersonType object from the database and sets a pointer, PersonTypePtr, to point to the retrieved PersonType object. DBMS 100 then calls mutator( ):

```
AddrTypePtr = returnValue;
PersonTypePtr->mutator("Home", returnValue, AddrTypePtr);
```

DBMS 100 sets AddrTypePtr to point to the AddrType object modified above using the pointer returned from the previous call to mutator( ). The second call to mutator( ) returns a pointer to the PersonType object that has been updated to point to the modified AddrType object. DBMS 100 stores the PersonType object, completing the update.

For setting values in new nested UDT structured type objects, DBMS 100 uses a combination of mutator( ) calls to set a value. DBMS 100 creates a new object including the data member to be modified. DBMS 100 modifies the new object using mutator( ) to include the new value. DBMS 100 then modifies the object that is to be the parent of the new object so that the parent object points to the new object including the new value.

In one example, referring to the UDT structured types PersonType and AddrType shown in FIG. 4, a user enters a statement to set the value of the Street data member in a new employee address member by using the clause: "Employee.Home(New AddrType( ).Street("MLK Avenue")). Where PersonTypePtr indicates the Employee struct_type object, DBMS 100 calls udtGetInstance( ) and mutator( ):

```
AddrTypePtr = udtGetInstance( );
*newValue = "MLK Avenue";
AddrTypePtr->mutator("Street", returnValue, newValue);
newValue = returnValue;
PersonTypePtr->mutator("Home", returnValue, newValue);
```

DBMS 100 creates a new AddrType object pointed to by AddrTypePtr using udtGetInstance( ). DBMS 100 sets the value of the Street member of the new object to "MLK Avenue", as in the previous example. After the first call to mutator( ), returnValue points to the AddrType object. DBMS 100 sets newValue to point to the AddrType object as well. DBMS 100 calls mutator( ) for the struct_type object representing the Home member of the PersonType struct_type object using the pointer PersonTypePtr to set or change which AddrType object represents the Home member. The second call to mutator( ) causes the entry in the Types array to point to the new AddrType object, pointed to by newValue. To set multiple data members for a new object, DBMS 100 makes multiple calls to mutator( ) for the new object.

An example of the SQL for a complete update of all the data members of a PersonType object is:

```
SET Employee = NEW;
PersonType.FirstName("Abraham").LastName("Lincoln").Age
(45).Home(NEW AddrType.Street("Log Cabin
Ave").City("Wilderness").Zipcode(80092));
```

DBMS 100 uses a combination of udtGetInstance( ) calls and mutator( ) calls to create the objects for the new data members and set the values for the new objects.

As described above, an EDT provides for comparing two UDT structured types for equivalence. DBMS 100 uses DBS Support Method equals( ) to compare two UDT structured types. DBMS 100 iterates through the data members of the two types represented by the objects pointed to by entries in the Types array. For each object in one of the types, DBMS 100 calls that object's equals( ) method comparing the object and the corresponding object in the other type. If any object's equals( ) method returns FALSE, the types are not equal. This pseudo-code provides an overview of the operation of equals( ):

```
struct_type::equals(other, returnValue)
    for (i=0; i<Number_types; i++)
    {
        if (Types[i]->equals(other->Types[i]) !=
        TRUE)
        {
            *returnValue = FALSE;
            return SUCCESS;
        }
    }
    return TRUE;
    return SUCCESS;
```

Figure 12:
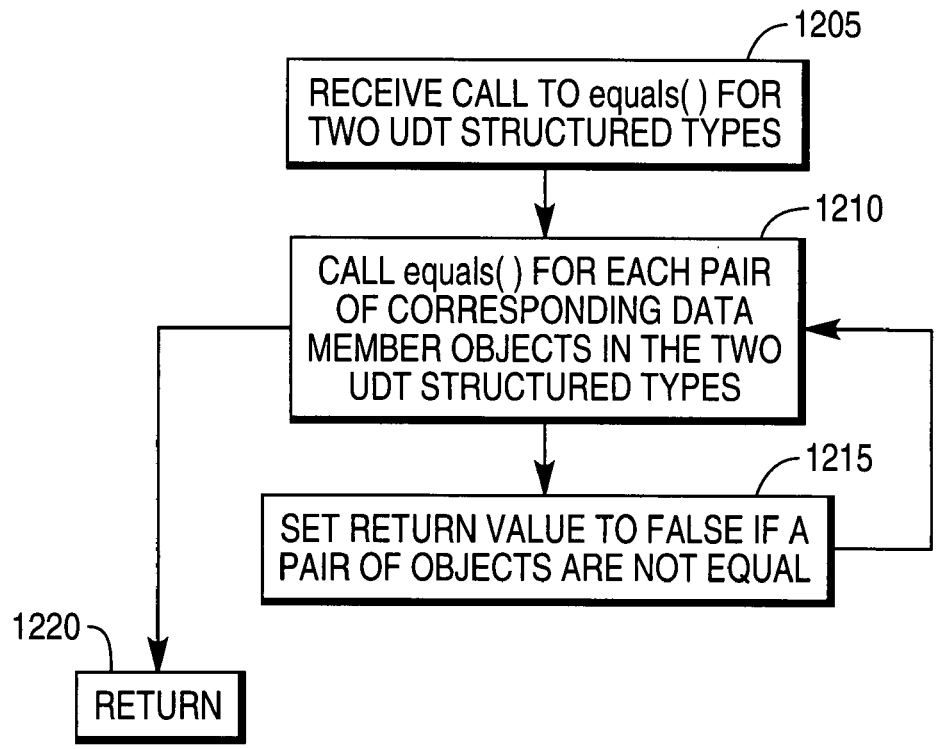
FIG. 12 is a flowchart of the operation of the DBS Support Method equals( ).

FIG. 12 is a flowchart of the operation of the DBS Support Method equals( ). DBMS 100 receives a call to equals( ), block 1205. DBMS 100 calls equals( ) for each pair of data member objects (e.g., iteratively), block 1210. DBMS 100 calls equals( ) for one object with a pointer to the corresponding object from the other UDT structured type passed as a parameter (e.g., the "other" parameter shown in equals( ) methods in blocks in FIG. 3). DBMS 100 also calls equals( ) in turn for nested data member objects. In a call to equals( ), DBMS 100 compares the objects and sets a return value to FALSE if the objects are not equal, block 1215. After returning from each data member object's equals( ) call, DBMS 100 returns from the original equals( ) call, block 1220. If any equals( ) call in the sequence of calls returned FALSE, the UDT structured types are not equivalent and the original call returns FALSE. In this way, DBMS 100 compares two UDT structured types by comparing two EDT objects and their member objects, including nested objects.

The various implementations of the invention are realized in electronic hardware, computer software, or combinations of these technologies. Most implementations include one or more computer programs executed by a programmable computer. For example, referring to FIG. 1, in one implementation, DBMS 100 includes one or more programmable computers implementing processing modules 105. N, data storage facilities $110_1 \ldots _N$, and parsing engine 120. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations based on a DBMS using a massively parallel processing (MPP) architecture, other types of database systems, including those that use a symmetric multiprocessing (SMP) architecture, are also useful in carrying out the invention. Accordingly, the present invention is not limited to only those implementations described above.

What is claimed is:

1. A computer-implemented method for providing an extensible data type in a database system, comprising:
    creating a type registry, where the type registry includes an entry for each of one or more data types each having a unique type identifier, and each entry indicates a registry object of the corresponding data type;
    defining an extensible data type by:
        defining one or more data members for the extensible data type,
        where a data member is of a data type;
        defining a type count indicating how many data members are associated with the extensible data type;
        defining a type context for each data member, where a type context includes a type identifier indicating an entry in the type registry corresponding to the type context's corresponding data member;
        where the extensible data type is implemented as an object-based data type; and
    creating an instance of an extensible data type by:
        receiving a call to a constructor function for the extensible data type, where the constructor function call includes a constructor string;
        creating an extensible data type object;
        parsing the constructor string to determine one or more data members for the extensible data type object;
        retrieving a type identifier from the type registry for each data member;
        creating a data member object for each data member;
        initializing each data member object; and
        initializing the extensible data type object, including storing a pointer to each created data member object in the extensible data type object.

2. The computer-implemented method of claim 1, where the constructor function call includes data member values, and creating and initializing data member objects includes storing the data member values in the data member objects.

3. The computer-implemented method of claim 1, further comprising storing an extensible data type object in an in-memory format by:
    creating an extensible data type object;
    accessing a build row storing data for a stored extensible data type object;
    retrieving data for the stored extensible data type object from the build row;
    iteratively retrieving data for each data member object indicated by the extensible data type object by sending a message to each data member object; and
    storing the retrieved data in the created extensible data type object.

4. The computer-implemented method of claim 1, further comprising changing a data value for a data member of an extensible data type object by:
    receiving a request to change a data value of a target data member of an extensible data type object, where the request indicates a new value;
    accessing a data member object indicated by the extensible data type object, where the accessed data member object corresponds to the target data member;
    sending a message to the accessed data member object to change the object's data value, where the message indicates the new value; and
    receiving a pointer to the extensible data type object.

5. A computer-implemented method for providing an extensible data type in a database system, comprising:
creating a type registry, where the type registry includes an entry for each of one or more data types each having a unique type identifier, and each entry indicates a registry object of the corresponding data type;
defining an extensible data type by:
defining one or more data members for the extensible data type, where a data member is of a data type;
defining a type count indicating how many data members are associated with the extensible data type;
defining a type context for each data member, where a type context includes a type identifier indicating an entry in the type registry corresponding to the type context's corresponding data member;
where the extensible data type is implemented as an object-based data type; and
storing an extensible data type object in a persistent in-storage format by:
creating a build row for storing the extensible data type object data;
storing data for the extensible data type object in the build row; and
iteratively storing data in the build row for each data member object indicated by the extensible data type object by sending a message to each data member object.

6. A computer-implemented method for providing an extensible data type in a database system, comprising:
creating a type registry, where the type registry includes an entry for each of one or more data types each having a unique type identifier, and each entry indicates a registry object of the corresponding data type;
defining an extensible data type by:
defining one or more data members for the extensible data type, where a data member is of a data type;
defining a type count indicating how many data members are associated with the extensible data type;
defining a type context for each data member, where a type context includes a type identifier indicating an entry in the type registry corresponding to the type context's corresponding data member;
where the extensible data type is implemented as an object-based data type; and
retrieving a data value for a data member of a nested extensible data type object by:
accessing a nested extensible data type object indicated by an extensible data type object;
accessing a data member object indicated by the nested extensible data type object by sending a message to the nested extensible data type object;
sending a message to the accessed data member object to return the object's data value; and
receiving the data value from the accessed data member object.

7. The computer-implemented method of claim 6, further comprising changing a data value for a data member of a nested extensible data type object by:
receiving a request to change a data value of a target data member of a nested extensible data type object indicated by a parent extensible data type object, where the request indicates a new value;
retrieving a pointer to the nested extensible data type object from the parent extensible data type object;
accessing a data member object indicated by the nested extensible data type object, where the accessed data member object corresponds to the target data member;
sending a first message to the accessed data member object to change the accessed data member object's data value, where the message indicates the new value;
receiving a pointer to the nested extensible data type object;
sending a second message to the parent extensible data type object to set the parent extensible data type object to point to the nested extensible data type object; and
receiving a pointer to the parent extensible data type object.

8. A computer-implemented method for providing an extensible data type in a database system, comprising:
creating a type registry, where the type registry includes an entry for each of one or more data types each having a unique type identifier, and each entry indicates a registry object of the corresponding data type;
defining an extensible data type by:
defining one or more data members for the extensible data type, where a data member is of a data type;
defining a type count indicating how many data members are associated with the extensible data type;
defining a type context for each data member, where a type context includes a type identifier indicating an entry in the type registry corresponding to the type context's corresponding data member;
where the extensible data type is implemented as an object-based data type; and
comparing a first extensible data type and a second extensible data type by:
iteratively comparing corresponding data members of a first extensible data type and a second extensible data type by sending messages to each data member of a registry object of the first extensible data type, where each message includes a pointer to a registry object for the corresponding data member of the second extensible data type;
returning a value indicating the first extensible data type and the second extensible data type are not equal if any data member objects return a value indicating the corresponding data member objects are not equal and
returning a value indicating the first extensible data type and the second extensible data type are equal if all the data member objects return a value indicating the corresponding data member objects are equal.

9. A computer program, stored on a tangible storage medium, for use in providing an extensible data type in a database system, the program comprising executable instructions that cause a computer to:
create a type registry, where the type registry includes an entry for each of one or more data types each having a unique type identifier, and each entry indicates a registry object of the corresponding data type; and
define an extensible data type by:
defining one or more data members for the extensible data type, where a data member is of a data type;
defining a type count indicating how many data members are associated with the extensible data type;
defining a type context for each data member, where a type context includes a type identifier indicating an entry in the type registry corresponding to the type context's corresponding data member;
where the extensible data type is implemented as an object-based data type;
receiving a call to a constructor function for the extensible data type, where the constructor function call includes a constructor string;

creating an extensible data type object;
parsing the constructor string to determine one or more data members for the extensible data type object;
retrieving a type identifier from the type registry for each data member;
creating a data member object for each data member;
initializing each data member object; and
initializing the extensible data type object, including storing a pointer to each created data member object in the extensible data type object.

10. The computer program of claim 9, where the constructor function call includes data member values, and creating and initializing data member objects includes storing the data member values in the data member objects.

11. The computer program of claim 9, further comprising executable instructions that cause a computer to store an extensible data type object in a persistent in-storage format by:
creating a build row for storing the extensible data type object data;
storing data for the extensible data type object in the build row; and
iteratively storing data in the build row for each data member object indicated by the extensible data type object by sending a message to each data member object.

12. The computer program of claim 9, further comprising executable instructions that cause a computer to store an extensible data type object in an in-memory format by:
creating an extensible data type object;
accessing a build row storing data for an extensible data type object;
retrieving data for the extensible data type object from the build row;
iteratively retrieving data for each data member object indicated by the extensible data type object by sending a message to each data member object; and
storing the retrieved data in memory.

13. The computer program of claim 9, further comprising executable instructions that cause a computer to change a data value for a data member of an extensible data type object by:
receiving a request to change a data value of a target data member of an extensible data type object, where the request indicates a new value;
accessing a data member object indicated by the extensible data type object, where the accessed data member object corresponds to the target data member;
sending a message to the accessed data member object to change the object's data value, where the message indicates the new value; and
receiving a pointer to the extensible data type object.

14. A computer program, stored on a tangible storage medium, for use in providing an extensible data type in a database system, the program comprising executable instructions that cause a computer to:
create a type registry, where the type registry includes an entry for each of one or more data types each having a unique type identifier, and each entry indicates a registry object of the corresponding data type; and
define an extensible data type by:
defining one or more data members for the extensible data type, where a data member is of a data type;
defining a type count indicating how many data members are associated with the extensible data type;
defining a type context for each data member, where a type context includes a type identifier indicating an entry in the type registry corresponding to the type context's corresponding data member;
where the extensible data type is implemented as an object-based data type;
retrieve a data value for a data member of a nested extensible data type object by:
accessing a nested extensible data type object indicated by an extensible data type object;
accessing a data member object indicated by the nested extensible data type object by sending a message to the nested extensible data type object;
sending a message to the accessed data member object to return the object's data value; and
receiving the data value from the accessed data member object.

15. The computer program of claim 14, further comprising executable instructions that cause a computer to change a data value for a data member of a nested extensible data type object by:
receiving a request to change a data value of a target data member of a nested extensible data type object indicated by a parent extensible data type object, where the request indicates a new value;
retrieving a pointer to the nested extensible data type object from the parent extensible data type object;
accessing a data member object indicated by the nested extensible data type object, where the accessed data member object corresponds to the target data member;
sending a first message to the accessed data member object to change the accessed data member object's data value, where the message indicates the new value;
receiving a pointer to the nested extensible data type object;
sending a second message to the parent extensible data type object to set the parent extensible data type object to point to the nested extensible data type object; and
receiving a pointer to the parent extensible data type object.

16. A computer program, stored on a tangible storage medium, for use in providing an extensible data type in a database system, the program comprising executable instructions that cause a computer to:
create a type registry, where the type registry includes an entry for each of one or more data types each having a unique type identifier, and each entry indicates a registry object of the corresponding data type; and
define an extensible data type by:
defining one or more data members for the extensible data type, where a data member is of a data type;
defining a type count indicating how many data members are associated with the extensible data type;
defining a type context for each data member, where a type context includes a type identifier indicating an entry in the type registry corresponding to the type context's corresponding data member;
where the extensible data type is implemented as an object-based data type;
compare a first extensible data type and a second extensible data type by:
iteratively comparing corresponding data members of a first extensible data type and a second extensible data type by sending messages to each data member of a registry object of the first extensible data type, where each message includes a pointer to a registry object for the corresponding data member object;
returning a value indicating the first extensible data type and the second extensible data type are not equal if any data member objects return a value indicating the corresponding data member objects are not equal and returning a value indicating the first extensible data type and the second extensible data type are equal if all the data member objects return a value indicating the corresponding data member objects are equal.

17. A computer-implemented database system, comprising:

one or more data storage facilities for use in storing data composing records in tables of a database;

one or more processing modules configured to manage the data stored in the data-storage facilities;

a database management component configured to provide an object-based extensible data type, where the extensible data type includes one or more data members;

a type registry accessible by the database management component, where the type registry stores a registry object for each type supported by the database system and for at least one instance of an extensible data type, where the at least one instance of the extensible data type comprises:

a data type for one or more data members;

a count type for indicating how many data members are associated with the extensible data type;

a context type for each data member, where a context type includes an identifier type for indicating an entry in the type registry corresponding to the context type's corresponding data member;

where the extensible data type is implemented as an object-based data type and where the extensible data type has one or more methods with one method providing a default-initialized instance of the extensible data type; and an extensible data object where the object is created as an extensible data type based on the at least one instance of the extensible data type.

18. The computer-implemented database system of claim 17, where one method of the extensible data type provides a persistent in-storage format for the extensible data type.

19. The computer-implemented database system of claim 17, where one method of the extensible data type provides an in-memory format for the extensible data type.

20. The computer-implemented database system of claim 17, where one method of the extensible data type compares two extensible data types for equivalence.

* * * * *